United States Patent
Ohmura

(10) Patent No.: US 10,890,917 B2
(45) Date of Patent: Jan. 12, 2021

(54) VEHICLE CONTROLLER

(71) Applicant: Mazda Motor Corporation, Hiroshima (JP)

(72) Inventor: Hiroshi Ohmura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 50 days.

(21) Appl. No.: 16/217,541

(22) Filed: Dec. 12, 2018

(65) Prior Publication Data

US 2019/0220030 A1     Jul. 18, 2019

(30) Foreign Application Priority Data

Jan. 17, 2018   (JP) ................. 2018-005379

(51) Int. Cl.
| | |
|---|---|
| *G05D 1/02* | (2020.01) |
| *G08G 1/16* | (2006.01) |
| *G05D 1/00* | (2006.01) |
| *B60W 30/16* | (2020.01) |
| *G01C 21/34* | (2006.01) |
| *B62D 15/02* | (2006.01) |
| *B62D 6/00* | (2006.01) |

(52) U.S. Cl.
CPC ......... *G05D 1/0223* (2013.01); *B60W 30/162* (2013.01); *B62D 15/025* (2013.01); *B62D 15/0265* (2013.01); *G01C 21/3415* (2013.01); *G05D 1/0088* (2013.01); *G08G 1/166* (2013.01); *B62D 6/00* (2013.01)

(58) Field of Classification Search
None
See application file for complete search history.

(56) References Cited

U.S. PATENT DOCUMENTS

2016/0349751 A1\* 12/2016 Sugimoto ............. B60W 30/00

FOREIGN PATENT DOCUMENTS

JP        2008149855 A      7/2008

\* cited by examiner

*Primary Examiner* — Tamara L Weber
(74) *Attorney, Agent, or Firm* — Alleman Hall Creasman & Tuttle LLP

(57) ABSTRACT

A vehicle controller configured to control traveling of a vehicle includes a processor configured to execute a nearby-object detection module, a first route computation module configured to compute a first target travel route specifying route and speed of a vehicle, a second route computation module configured to compute a second target travel route specifying route and speed of so as to prompt the vehicle to avoid the detected nearby object, and a control module configured to control at least one of a traveling speed and vehicle steering so as to prompt the vehicle to travel on the first or second target travel route. The first route computation module computes the route so as to prompt the vehicle to travel with lower energy consumption, and the control module switches the target travel route to the second route when the nearby object to be avoided is detected within a range.

6 Claims, 10 Drawing Sheets

VEHICLE CONTROLLER

TECHNICAL FIELD

The present disclosure relates to a vehicle controller, and particularly to a vehicle controller which controls traveling of a vehicle.

BACKGROUND OF THE DISCLOSURE

JP2008-149855A discloses a device for generating a line indicating a target route when a vehicle changes the heading. The device determines, based on information on the position of the vehicle and information on the position of a post-change route, a target waypoint for the vehicle in the middle of route change, and generates the target route accordingly. A technique is also known with which a travel route is specified based on information on obstacles located near the vehicle or on magnetic information obtained from magnetic markers embedded in roads.

A travel route is to be specified to avoid a collision of a vehicle with nearby vehicles or obstacles as a matter of course, and is preferably specified to allow a vehicle to reach a destination with lower consumption of energy (e.g., fuel for vehicles driven by internal-combustion engines, power for electric cars). A vehicle tends to consume a greater amount of energy in the case of traveling with repeated accelerations and decelerations over a certain distance to reach a destination than in the case of traveling at a constant speed over the same distance to reach the destination. Thus, the travel route of the vehicle is preferably specified together with the speed of the vehicle to travel along the route with lower energy consumption. Unfortunately, the present inventor has revealed that a driver may experience discomfort when the travel route and the speed for the route are specified based on calculations so as to minimize the energy consumption.

SUMMARY OF THE DISCLOSURE

The present disclosure is made in view of the above situations and aims to provide a vehicle controller capable of specifying a travel route which is less likely to cause a driver discomfort (e.g., because the driver's expected vehicle motion differs from the actual vehicle motion) and allows a vehicle to travel with lower energy consumption.

According to one aspect of the present disclosure, a vehicle controller configured to control traveling of a vehicle is provided, which includes a processor configured to execute a nearby-object detection module to detect a nearby object, a first route computation module to compute a first target travel route specifying a route on which the vehicle is to travel and a speed at which the vehicle is to travel along the route, a second route computation module to compute a second target travel route specifying a route on which the vehicle is to travel and a speed at which the vehicle is to travel along the route, so as to prompt the vehicle to avoid the detected nearby object, and a control module to control at least one of a traveling speed and steering of the vehicle so as to prompt the vehicle to travel on one of the first target travel route and the second target travel route. The first route computation module computes the first target travel route so as to prompt the vehicle to travel with lower energy consumption. The control module switches the target travel route to the second target travel route when the nearby object to be avoided is detected within a range at a certain distance from the vehicle.

In this configuration, the first route computation module computes the first target travel route so as to reduce the energy required for travelling of the vehicle, and the second route computation module computes the second travel route so as to avoid the detected nearby object. The control module switches the target travel route to the second target travel route when the nearby object to be avoided is detected within the range at the certain distance from the vehicle.

According to this configuration, the control module controls the traveling speed and/or the steering of the vehicle to travel on the first target travel route computed to allow the vehicle to travel with the lower energy consumption. This enables the vehicle to reduce its energy consumption. In addition, the control module switches the target travel route to the second target travel route when a nearby object to be avoided is detected within the range at the certain distance from the vehicle. Thus, only when the vehicle needs to avoid the nearby object, the second target travel route is adopted, and accordingly, a driver is less likely to feel discomfort.

The second target travel route may define a travel route extending over a section shorter than the first target travel route.

In order to reduce the energy consumption of the traveling vehicle, it can be considered to set a travel route and a speed suitable for the route over a comparatively long section and perform the steering and acceleration/deceleration of the vehicle slowly. Accordingly, in view of reducing the energy consumption, it is required to detect a distant obstacle or the like as early as possible to start the steering or start deceleration of the vehicle at an early stage in order to avoid the obstacle. However, when the steering or the deceleration is started by the vehicle controller early to avoid the obstacle very far away, the driver may be confused. Especially when the steering or the deceleration is started to avoid the obstacle at a distance (position) the driver cannot visually confirm, the driver cannot understand the reason why the steering or the deceleration is executed by the vehicle controller so he/she feels discomfort. According to this configuration, since the second target travel route defines a travel route extending over a section shorter than the first target travel route, this prevents early start of the vehicle control for evasion of the obstacle or the like in a faraway position, and the driver is less likely to feel discomfort accordingly.

The second route computation module may specify a plurality of speed limit distributions in which allowable upper limits of a relative speed are designated to areas around the nearby object to be avoided detected by the nearby-object detection module, and compute the second target travel route conforming to the plurality of speed limit distributions.

According to this configuration, the plurality of speed limit distributions in which allowable upper limits of the relative speed are designated to areas around the nearby object to be avoided, and the second target travel route conforming to the speed limit distributions are computed. This enables the vehicle to avoid an obstacle or the like in an appropriate manner according to the circumstances, and accordingly, the driver is less likely to feel discomfort.

DETAILED DESCRIPTION OF THE DISCLOSURE

Figure 1:
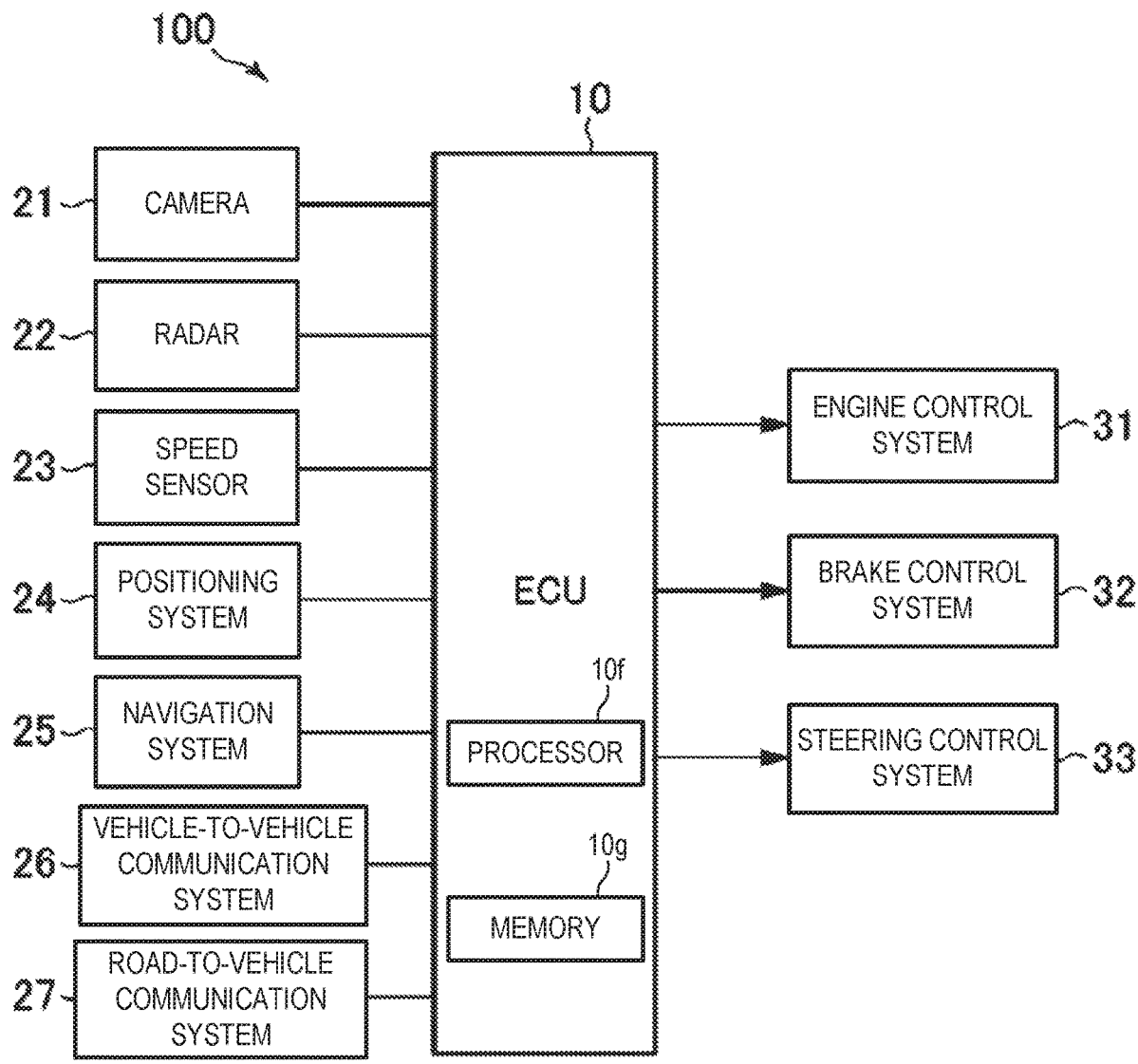
FIG. 1 is a configuration diagram of a vehicle controller according to an embodiment of the present disclosure.
Figure 2:
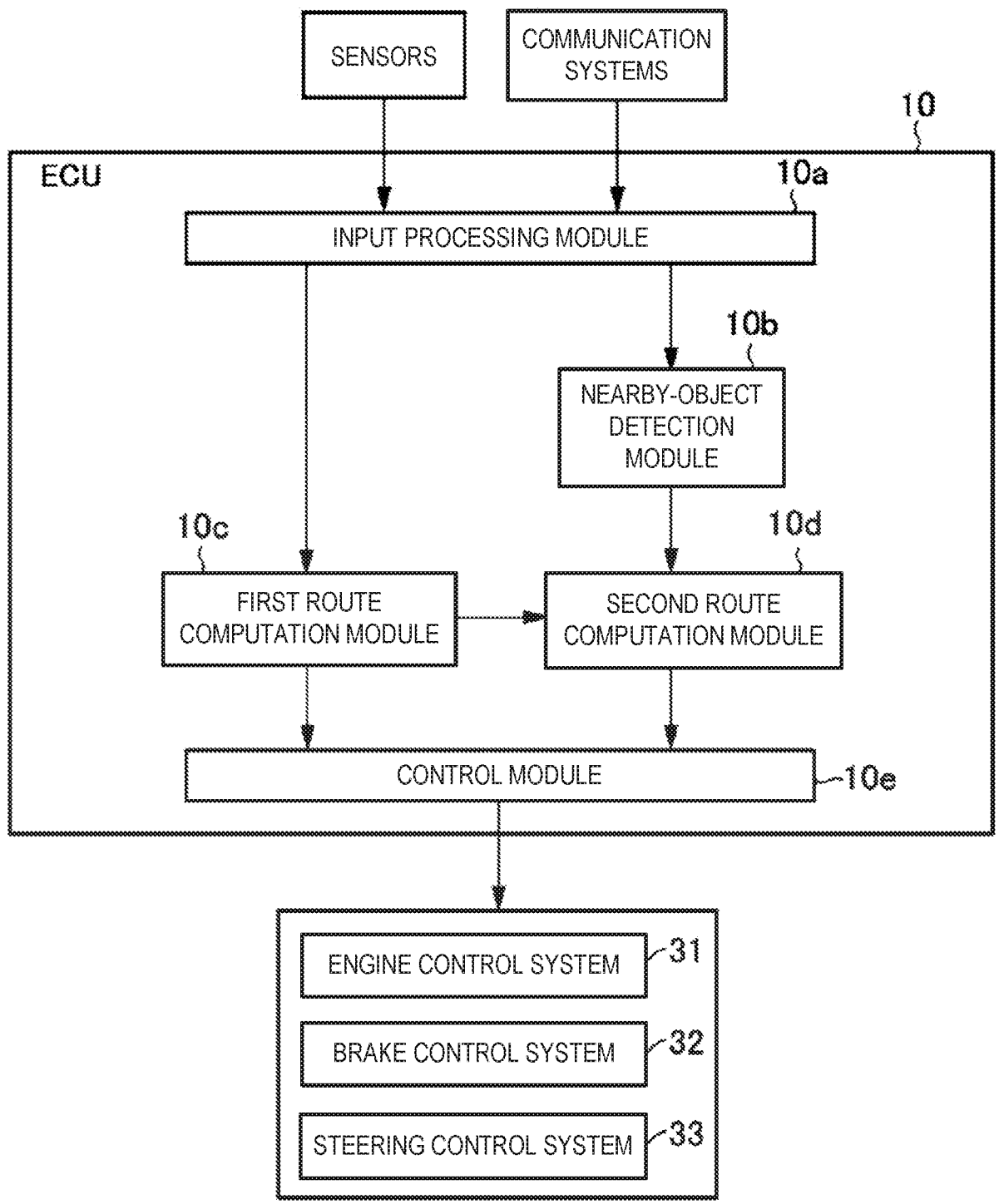
FIG. 2 is a control block diagram of the vehicle controller according to the embodiment of the present disclosure.

A vehicle controller according to an embodiment of the present disclosure will be described below with reference to the accompanying drawings. First, the configuration of the vehicle controller will be described with reference to FIGS. 1 and 2. FIG. 1 is a configuration diagram of the vehicle controller and FIG. 2 is a control block diagram of the vehicle controller.

When being installed in a vehicle 1 which may be herein simply referred to as "the vehicle" (see, for example, FIG. 3), a vehicle controller 100 according to this embodiment provides the vehicle 1 with different drive assistance controls corresponding to different drive assistance modes. The driver is allowed to select a desired drive assistance mode from the different drive assistance modes.

As illustrated in FIG. 1, the vehicle controller 100 includes a vehicle controller (e.g., electronic control unit (ECU)) 10, sensors, switches, control systems, and a driver's interface (not illustrated) which is for a user input of the drive assistance mode, which are to be installed in the vehicle 1. The sensors and switches include a camera 21 which captures images of views outside the vehicle, a millimeter wave radar 22, a speed sensor 23 which detects behaviors of the vehicle, a positioning system 24, a navigation system 25, a vehicle-to-vehicle communication system 26, and a road-to-vehicle communication system 27. The control systems include an engine control system 31, a brake control system 32, and a steering control system 33.

The ECU 10 illustrated in FIG. 1 is a computer including a processor 10f such as a central processing unit (CPU) and memory 10g which stores various programs, an input/output device, etc. The ECU 10 is capable of outputting request signals based on drive assistance mode selection signals received from the driver's interface, specified speed signals, and signals received from the sensors and switches, so as to appropriately activate the engine control system 31, the brake control system 32, and the steering control system 33.

The camera 21 captures images of the view in front of the vehicle 1 and outputs the data on the captured image. With reference to the image data, the ECU 10 identifies objects (e.g., vehicles; pedestrians; roads; demarcation lines such as a lane separation line, a white line, or a yellow line; traffic lights; traffic-control signs; stop lines; intersections; a vehicle ahead of the vehicle; or obstacles). In addition, the vehicle 1 may be equipped with external cameras which capture images of side views and/or rear views from the vehicle 1. The vehicle 1 may also be equipped with an internal camera which captures images of the driver at the wheel.

The millimeter wave radar 22 determines the position and the speed of the object (particularly, a vehicle ahead of the vehicle 1 (i.e., preceding vehicle), a parked vehicle, a pedestrian, an obstacle, etc.), transmits radio waves toward the front of the vehicle 1, and receives reflected waves caused by the transmitted waves reflecting off the object. Then, based on the transmitted waves and the received waves, the millimeter wave radar 22 measures the distance between the vehicle 1 and the object (e.g., the vehicle-to-vehicle distance) and the relative speed of the vehicle 1 with respect to the object. The vehicle controller 100 includes, as the millimeter wave radar 22, a front radar which detects an object in front of the vehicle 1, a side radar which detects an object to a side of the vehicle 1, and a rear radar which detects an object behind the vehicle 1. The millimeter wave radar 22 may be replaced with, for example, a laser radar or an ultrasonic sensor which measures the distance between the vehicle 1 and the object and the relative speed of the vehicle 1. Alternatively, a plurality of sensors may constitute a device which determines the position and the speed.

The speed sensor 23 measures the absolute speed of the vehicle 1.

The positioning system 24 may be a GPS system and/or a gyro system, and determines the position of the vehicle 1 (current vehicle position information).

The navigation system 25 stores map information and provides the map information to the ECU 10. Based on the map information and the current vehicle position information, the ECU 10 identifies roads, intersections, traffic-control signs, buildings, etc., around the vehicle 1 (in the direction of travel, in particular). The map information may be stored in the ECU 10.

The vehicle-to-vehicle communication system 26 is an inter-vehicular communication system and enables the vehicle and nearby traveling vehicles to exchange information on, for example, the vehicle position and the travel speed. The vehicle-to-vehicle communication system 26 enables acquisition of information on, for example, the position and the speed of the vehicle parked or traveling away in some distance on the travel route of the vehicle.

The road-to-vehicle communication system 27 is a communication system between the vehicle and traffic infrastructures on roads. The road-to-vehicle communication system 27 enables acquisition of, for example, information on the positions of traffic lights on the travel route of the vehicle and the instances at which the traffic lights change, the information on the traffic-control signs on the travel route and the positions of stop lines, and the like.

The engine control system 31 is a controller which controls an engine of the vehicle 1. When the vehicle 1 is required to accelerate or decelerate, the ECU 10 outputs, to the engine control system 31, an engine output change request signal for requesting a change in the engine output so as to achieve a target acceleration/deceleration speed.

The brake control system 32 is a controller which controls a brake device of the vehicle 1. When the vehicle 1 needs to decelerate, the ECU 10 outputs, to the brake control system 32, a brake request signal for applying a breaking force to the vehicle 1 so as to achieve the target acceleration/deceleration speed.

The steering control system 33 is a controller which controls a steering device of the vehicle 1. When the vehicle 1 is required to change its traveling direction, the ECU 10 outputs, to the steering control system 33, a steering-direction change request signal for requesting a change in the steering direction so as to achieve a target steering angle.

As illustrated in FIGS. 1 and 2, the ECU 10 includes the processor 10*f* configured to execute an input processing module 10*a*, a nearby-object detection module 10*b*, a first-target-travel-route computation module (first route computation module) 10*c*, a second-target-travel-route computation module (second route computation module) 10*d*, and a control module 10*e* to perform their respective functions. These modules are stored in the memory 10*g* as software. It is not always required that a single processor 10*f* execute the modules to perform the above functions as in this embodiment, and a plurality of processors may instead execute these functions.

The input processing module 10*a* processes input information input from the individual sensors such as the camera 21 and the millimeter wave radar 22, and the individual communication systems such as the positioning system 24, the navigation system 25, the vehicle-to-vehicle communication system 26, and the road-to-vehicle communication system 27. The input processing module 10*a* analyzes the input information inputted from the individual sensors and the individual communication systems to determine the driving lane in which the vehicle is traveling (the lane separation lines on both sides of the lane) and the form of the road on which the vehicle is traveling.

The nearby-object detection module 10*b* recognizes (identifies) nearby objects around the vehicle based on the input signals from the sensors such as the millimeter wave radar 22, the analysis of the images captured by the camera 21, and the input information from the communication systems. The input processing module 10*a* is capable of recognizing, as nearby objects, objects classified into about 35 categories based on the input information.

The first route computation module 10*c* computes a first target travel route for the vehicle based on the input information inputted from, for example, the camera 21, the millimeter wave radar 22, the speed sensor 23, the positioning system 24, the navigation system 25, the vehicle-to-vehicle communication system 26, and the road-to-vehicle communication system 27 and processed by the input processing module 10*a*. The first route computation module 10*c* computes the first target travel route specifying the route on which the vehicle is to travel and the speed at which the vehicle is to travel along the route, so as to prompt the vehicle to travel with lower energy consumption. The first route computation module 10*c* computes a target travel route extending over a relatively long section (e.g., about 0.5 to 1 km). The computation of the first target travel route in this embodiment does not factor in the nearby objects such as the obstacles detected by the nearby-object detection module 10*b*.

The second route computation module 10*d* computes a second target travel route specifying the route on which the vehicle is to travel and the speed at which the vehicle is to travel along the route, so as to prompt the vehicle to avoid the nearby objects detected by the nearby-object detection module 10*b*. The second route computation module 10*d* corrects the first target travel route computed by the first route computation module 10*c* and computes a second corrected travel route. For example, the second route computation module 10*d* specifies a plurality of speed limit distributions in which allowable upper limits of the relative speed are designated to the areas around the nearby object to be avoided which has been detected by the nearby-object detection module 10*b*, and corrects the first target travel route to compute the second target travel route conforming to the speed limit distributions.

Then, the second route computation module 10*d* selects travel routes satisfying given constraints from among the travel routes conforming to the speed limit distributions. Of the selected travel routes, a travel route which gives a minimum evaluation function is designated as the second target travel route by the second route computation module 10*d*. In other words, the second route computation module 10*d* computes the second target travel route based on the speed limit distributions, the evaluation function, and the constraints. In this embodiment, the second target travel route computed by the second route computation module 10*d* defines a travel route extending over a section (e.g., about 0.2 km) shorter than the first target travel route computed by the first route computation module 10*c*.

The control module 10*e* controls the speed and the steering of the vehicle such that the vehicle travels on the first target travel route computed by the first route computation module 10*c* or on the second target travel route computed by the second route computation module 10*d*. When the nearby-object detection module 10*b* detects a nearby object to be avoided within a range at a certain distance from the vehicle, the control module 10*e* switches the currently adopted travel route to the second target travel route computed by the second route computation module 10*d*.

The ECU 10 outputs a request signal to at least one of the engine control system 31, the brake control system 32, and the steering control system 33 so as to achieve the target acceleration/deceleration speed and the target steering angle that have been output as control signals from the control module 10*e*.

The following describes drive assistance modes provided by the vehicle controller 100 according to this embodiment. This embodiment involves four drive assistance modes, namely, a speed limit mode being a driver's steering mode, a preceding-vehicle following mode being an autonomous steering mode, an automatic speed control mode being a driver's steering mode, and a basic control mode which is to be activated when no other drive assistance mode is selected.

<Preceding-Vehicle Following Mode>

The preceding-vehicle following mode is principally an autonomous steering mode in which the vehicle 1 follows the preceding vehicle with a constant vehicle-to-vehicle distance therebetween in accordance with their speeds. This mode involves a steering control, the speed control (e.g., an engine control, a brake control), and an obstacle evasion control (e.g., the speed control and the steering control) which are automatically performed by the vehicle controller 100.

In the preceding-vehicle following mode, the steering control and the speed control are performed differently depending on whether lane edges are detected and on whether a preceding vehicle is traveling ahead. The lane edges refer to both edges of a lane in which the vehicle 1 travels (e.g., a lane separation line such as a white line, a roadside, a curb, a median strip, a guardrail) and is a boundary between the vehicle and an adjacent lane, sidewalk, etc. The input processing module 10a included in the ECU 10 detects the lane edges based on the data on the image captured by the camera 21. The lane edges may be detected based on the map information stored in the navigation system 25. Unfortunately, the detection of the lane edges may not be possible if the vehicle 1 travels on an unpaved road such as a plain provided with no lanes or if the reading of the image data provided by the camera 21 fails.

The ECU 10, in which the processor 10f executes a preceding-vehicle detection module, detects a preceding vehicle based on the image data output by the camera 21 and the measurement data provided by the millimeter wave radar 22. Specifically, the ECU 10 detects, as a preceding vehicle, a vehicle traveling ahead of the vehicle based on the image data provided by the camera 21. In this embodiment, any vehicle traveling ahead of the vehicle 1 within a certain vehicle-to-vehicle distance (e.g., 400 to 500 m) as measured by the millimeter wave radar 22 is detected as a preceding vehicle.

In the preceding-vehicle following mode, when the nearby-object detection module 10b detects a nearby object to be avoided, the first target travel route is corrected regardless of whether a preceding vehicle is traveling ahead or whether the lane edges are detected. This enables the automatic obstacle (nearby-object) evasion.

<Automatic Speed Control Mode>

The automatic speed control mode is a driver's steering mode in which the speed control is performed to maintain the vehicle speed preset by the driver (constant speed). This mode involves the speed control (e.g., the engine control, brake control) automatically performed by the vehicle controller 100 but eliminates the steering control. In the automatic speed control mode, the vehicle 1 travels with the preset vehicle speed maintained. In a case where the driver depresses an accelerator pedal, however, the vehicle 1 may accelerate to travel at a speed faster than the preset speed. In a case where the driver presses the brake pedal, the vehicle 1 decelerates because an expression of the driver's intention overrides the preset speed. When the vehicle 1 is about to overtake the preceding vehicle, the speed of the vehicle 1 is controlled such that the vehicle 1 follows the preceding vehicle with a vehicle-to-vehicle distance therebetween in accordance with their speeds. The vehicle speed is controlled to return to the preset speed when no vehicle travels ahead.

<Speed Limit Mode>

The speed limit mode is a driver's steering mode for speed control in which the speed control is performed such that the speed of the vehicle 1 does not exceed the speed limit indicated by a speed sign or the speed preset by the driver. This involves the speed control (engine control) automatically performed by the vehicle controller 100. The ECU 10 may specify the speed limit through image recognition processing on the image data about the speed indicated by a speed sign or on a road surface which is captured by the camera 21. Alternatively, the speed limit may be received from the outside through wireless communications. In the speed limit mode, even if the driver depresses the accelerator pedal to accelerate the vehicle 1 to a speed higher than the speed limit, the speed of the vehicle 1 can only be increased to the speed limit.

<Basic Control Mode>

The basic control mode is the mode (off mode) in which no other drive assistance mode is selected via the driver's interface. This mode does not involve the steering control and the speed control which are automatically controlled by the vehicle controller 100. Note that the collision avoidance control is performed if there is a possibility that the vehicle 1 will collide with, for example, an oncoming vehicle. Similarly, the collision avoidance is performed in the preceding-vehicle following mode, the automatic speed control mode, and the speed limit mode.

Figure 3:
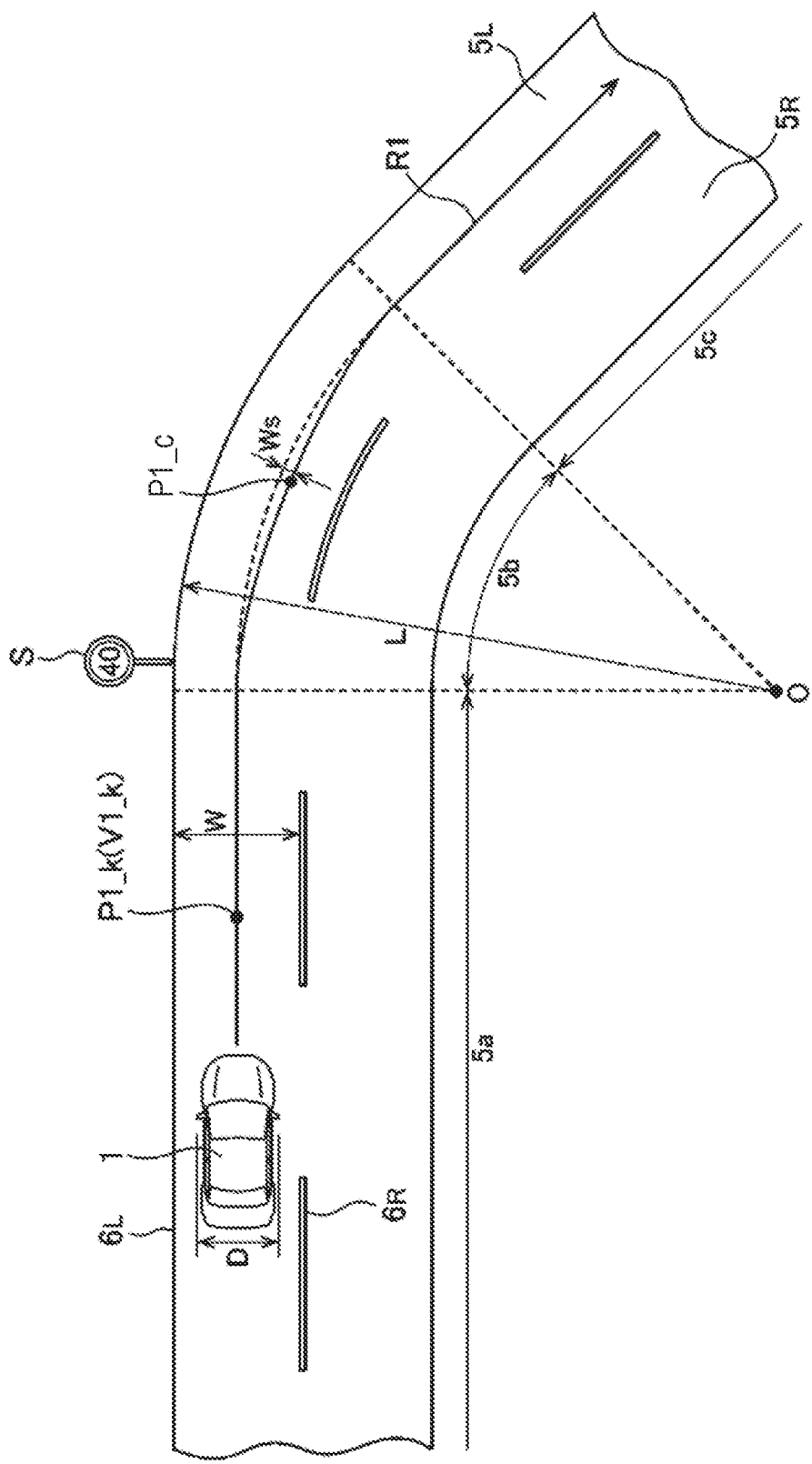
FIG. 3 is a diagram illustrating a travel route R1 specified by the vehicle controller according to the embodiment of the present disclosure.
Figure 4:
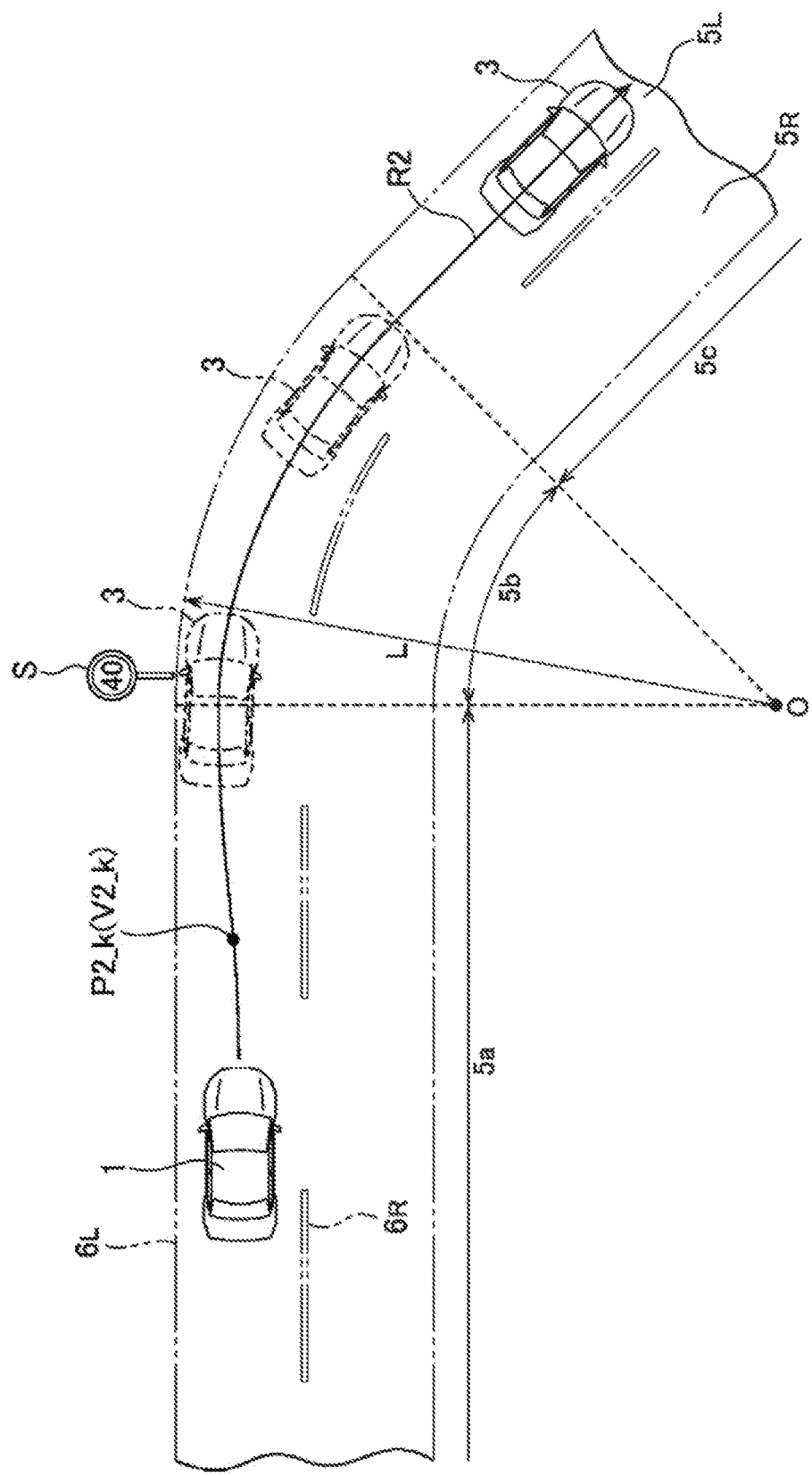
FIG. 4 is a diagram illustrating a travel route R2 specified by the vehicle controller according to the embodiment of the present disclosure.
Figure 5:
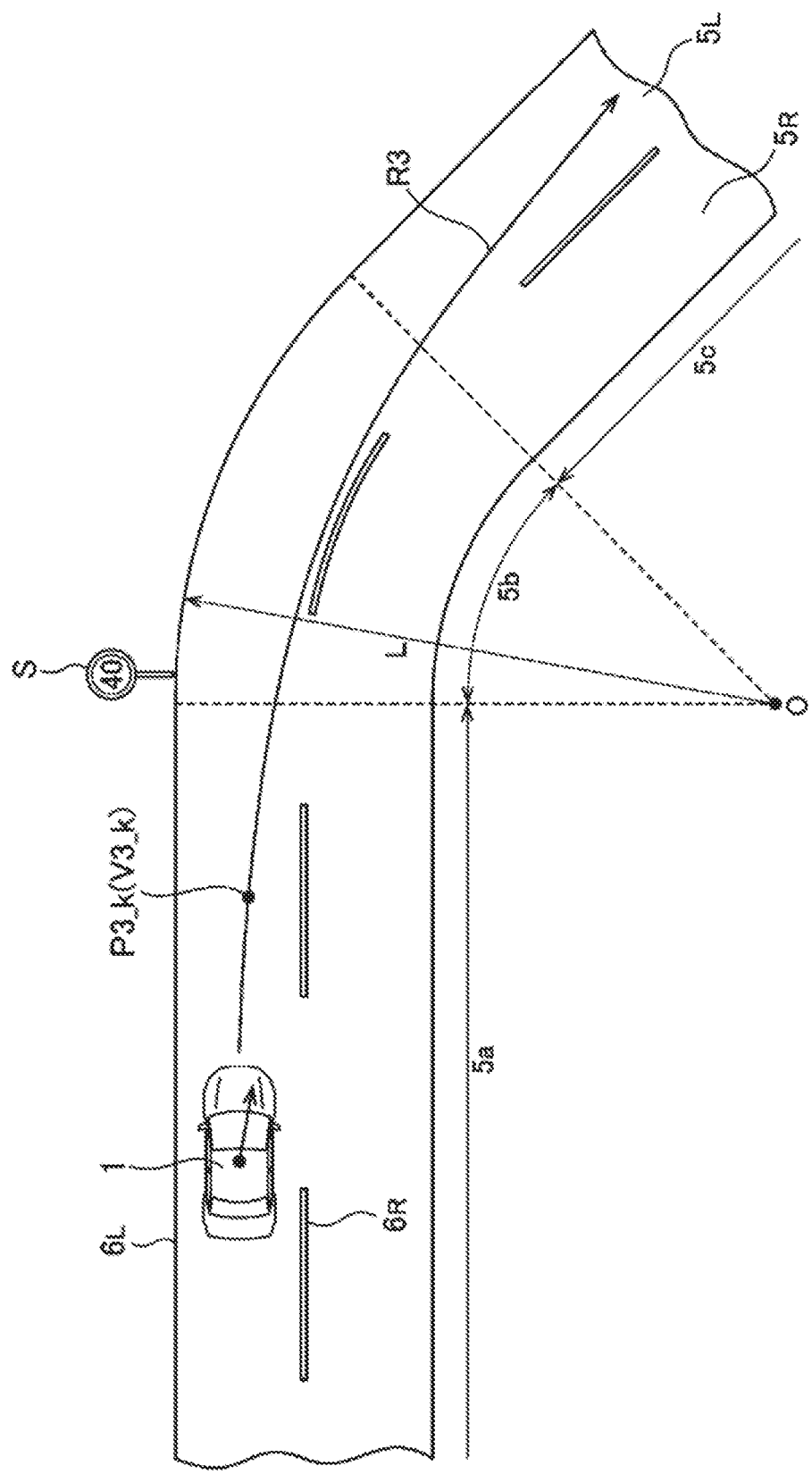
FIG. 5 is a diagram illustrating a travel route R3 specified by the vehicle controller according to the embodiment of the present disclosure.

With reference to FIGS. 3 to 5, the following describes a plurality of travel routes computed by the vehicle controller 100 according to this embodiment. FIGS. 3 to 5 are diagrams illustrating travel routes R1 to R3, respectively. The first route computation module 10c included in the ECU 10 computes the following travel routes R1 to R3 repeatedly (e.g., every 0.1 seconds). The ECU 10 computes, based on information provided by, for example, the sensors, a travel route spanning a certain distance (e.g., 0.5 to 1 km) from the current position. Travel routes Rx (x=1, 2, 3) in FIGS. 3 to 5 are given in accordance with a target position (Px_k) on the travel route for the vehicle 1 and a target speed (Vx_k) (K=0, 1, . . . , n) of the vehicle 1. In addition to the target speed, target values associated with variables (e.g., acceleration, the amount of change in acceleration, a yaw rate, a steering angle, a vehicle angle) at each target position may be given.

The travel routes (the travel routes R1 to R3) in FIGS. 3 to 5 are computed based on a shape of a travel route, a track of a preceding vehicle, a travel behavior of the vehicle 1, and the preset vehicle speed, regardless of the information on detection of nearby objects (obstacles such as a parked vehicle and a pedestrian) on the road on which the vehicle 1 travels or nearby objects around the road. The computation in this embodiment disregards the information on the nearby objects as described above, thus reducing the overall load of computing the travel routes.

For easy understanding, the following describes travel routes computed for the vehicle 1 traveling on a road 5 including a linear section 5a, a curving section 5b, and a linear section 5c. The road 5 has a lane $5_R$ on the right-hand side and a lane $5_L$ on the left-hand side. As of now, assume that the vehicle 1 travels in the lane $5_L$ through the linear section 5a.

(Travel Route R1)

The travel route R1 illustrated in FIG. 3 spans a certain distance such that the vehicle 1 keeps traveling in the lane $5_L$ along the shape of the road 5. Specifically, the travel route R1 is given such that the vehicle 1 is on the midsection of the lane $5_L$ while traveling the linear sections 5a and 5c, and that the vehicle 1 is on the inner side with respect to the midsection of the lane $5_L$ in the width direction (closer to a center O of a curvature on a curvature radius L in the curving section) while traveling the curving section 5b.

The data on the image of the view around the vehicle 1 captured by the camera 21 is subjected to the image recognition processing, and lane edges $6_R$ and $6_L$ are detected accordingly. As mentioned above, the lane edges are, for example, demarcation lines (e.g., white lines) or road shoulders. In addition, a lane width W of the lane $5_L$ and the curvature radius L in the curving section 5b are computed based on the detected lane edges $6_R$ and $6_L$. Alternatively, the lane width W and the curvature radius L may be obtained from the map information stored in the navigation system 25. Furthermore, the speed limit indicated by a speed sign S or on a road surface is read from the image data. Alternatively, the speed limit may be received from, for example, the road-to-vehicle communication system 27 through wireless communications as mentioned above.

For the linear sections 5a and 5c, the first route computation module 10c provides target positions P1_k on the travel route R1 such that the center in the width direction (e.g., the center of gravity) of the vehicle 1 passes the midsection in the width direction between the lane edges $6_R$ and $6_L$.

For the curving section 5b, the first route computation module 10c makes settings such that a displacement Ws from the central position in the width direction of the lane $5_L$ toward the inner side is maximized at a central position P1_c in the longitudinal direction of the curving section 5b. The displacement Ws is computed based on the curvature radius L, the lane width W, and a width dimension D of the vehicle 1 (a preset value stored in the memory of the ECU 10). Then, the first route computation module 10c provides the target positions P1_k on the travel route R1 in a manner to smoothly link the central position P1_c in the curving section 5b to the central positions in the width direction between the linear sections 5a and 5c. Note that at the entrance to/exit from the curving section 5b, the travel route R1 in the linear sections 5a and 5c may be provided on the inner side.

A target speed V1_k at each of the target positions P1_k on the travel route R1 is principally a speed set by the driver using the driver's interface or a vehicle speed preset by the vehicle controller 100 (constant speed). If the preset vehicle speed exceeds a first speed limit acquired based on, for example, the speed sign S or a second speed limit determined in accordance with the curvature radius L in the curving section 5b, the target speed V1_k at each of the target positions P1_k on the travel route is limited to the first or second speed limit lower than the other.

(Travel Route R2)

As illustrated in FIG. 4, the travel route R2 spans a certain distance such that it follows a track of a preceding vehicle 3. The position and the speed of the preceding vehicle 3 in the lane $5_L$ in which the vehicle 1 travels are continuously computed based on the image data provided by the internal/external cameras 21, the measurement data provided by the millimeter wave radar 22, and the speed of the vehicle 1 measured by the speed sensor 23, and are stored as preceding-vehicle track information. Based on the preceding-vehicle track information, the track of the preceding vehicle 3 is designated as the travel route R2 (target position P2_k, target speed V2_k).

(Travel Route R3)

As illustrated in FIG. 5, the travel route R3 spans a certain distance based on the current state of the vehicle 1 driven by the driver. Thus, the travel route R3 is determined based on the position and the speed estimated from the current travel behaviors of the vehicle 1.

Based on the steering angle, the yaw rate, and a lateral acceleration of the vehicle 1, the first route computation module 10c computes a target position P3_k on the travel route R3 spanning the certain distance. Based on the current speed and the acceleration of the vehicle 1, the first route computation module 10c also computes a target speed V3_k associated with the travel route R3 spanning the certain distance.

The following describes the relationship between the drive assistance mode and the travel routes in the vehicle controller 100. In this embodiment, when the driver operates the driver's interface to select one drive assistance mode, a travel route is selected in accordance with the selected drive assistance mode.

If the lane edges are detected in the preceding-vehicle following mode, the travel route R1 is adopted regardless of whether a preceding vehicle is traveling ahead. In this case, the speed set by using the driver's interface is adopted as the target speed. If the lane edges are not detected and a preceding vehicle is detected in the preceding-vehicle following mode, the travel route R2 is adopted. In this case, the target speed is set in accordance with the speed of the preceding vehicle. If the lane edges and a preceding vehicle are not detected in the preceding-vehicle following mode, the travel route R3 is adopted.

In the automatic speed control mode, the travel route R3 is adopted. The automatic speed control mode is the mode in which the speed control is performed automatically as described above. In this mode, the speed set by using the driver's interface is adopted as the target speed. In addition, the steering control is performed based on the driver's operation of a steering wheel.

Similarly, the travel route R3 is adopted in the speed limit mode. The speed limit mode is also the mode in which the speed control is automatically performed as described above. In this mode, the target speed is determined to fall within the speed limit in accordance with the degree of depression of the accelerator pedal pressed down by the driver. The steering control is performed based on the deriver's operation of the steering wheel.

In the basic control mode (off mode), the travel route R3 is adopted. The basic control mode is basically similar to the state in which no speed limit is set in the speed limit mode.

Figure 6:
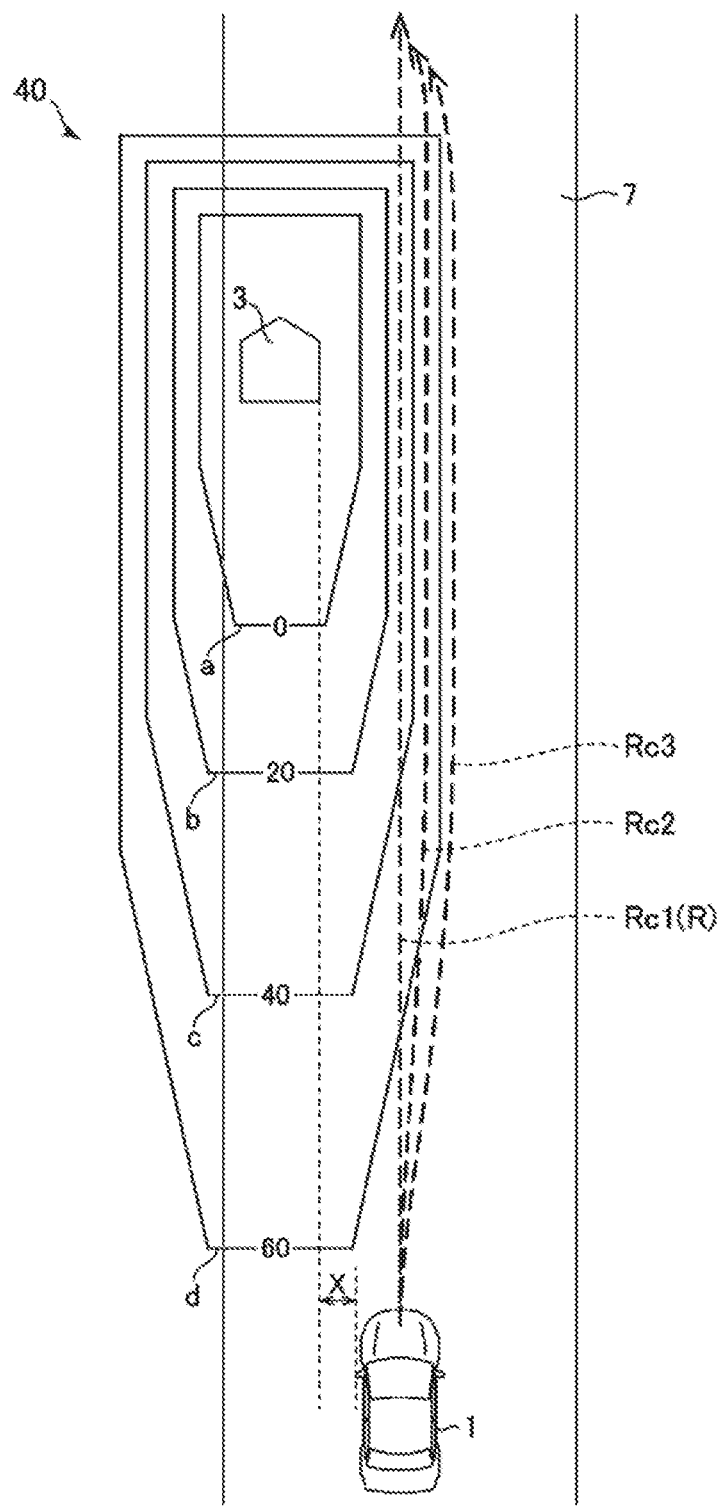
FIG. 6 is a diagram illustrating evasion of an obstacle through correction of a travel route by the vehicle controller according to the embodiment of the present disclosure.
Figure 7:
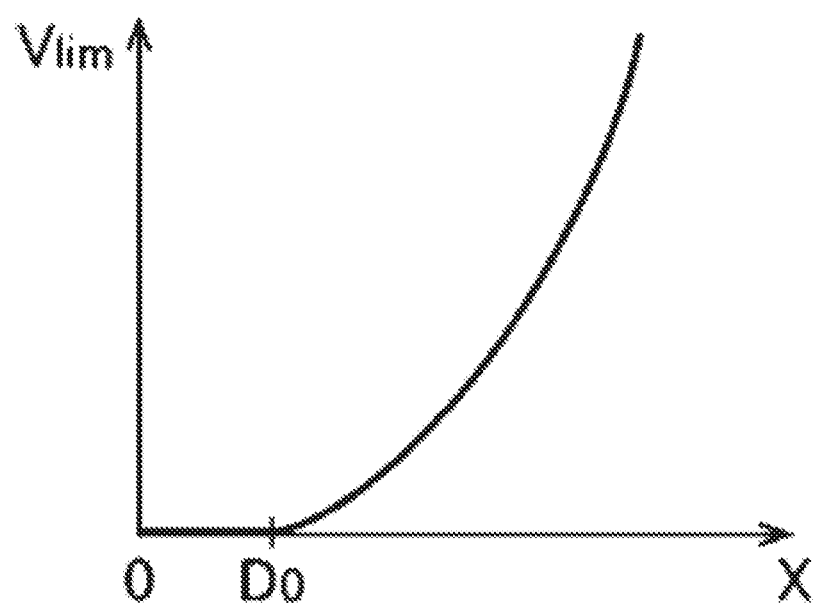
FIG. 7 is a graph showing the relationship between the allowable upper limit of the speed of a vehicle passing an obstacle and the clearance therebetween for the obstacle evasion achieved by the vehicle controller according to the embodiment of the present disclosure.
Figure 8:
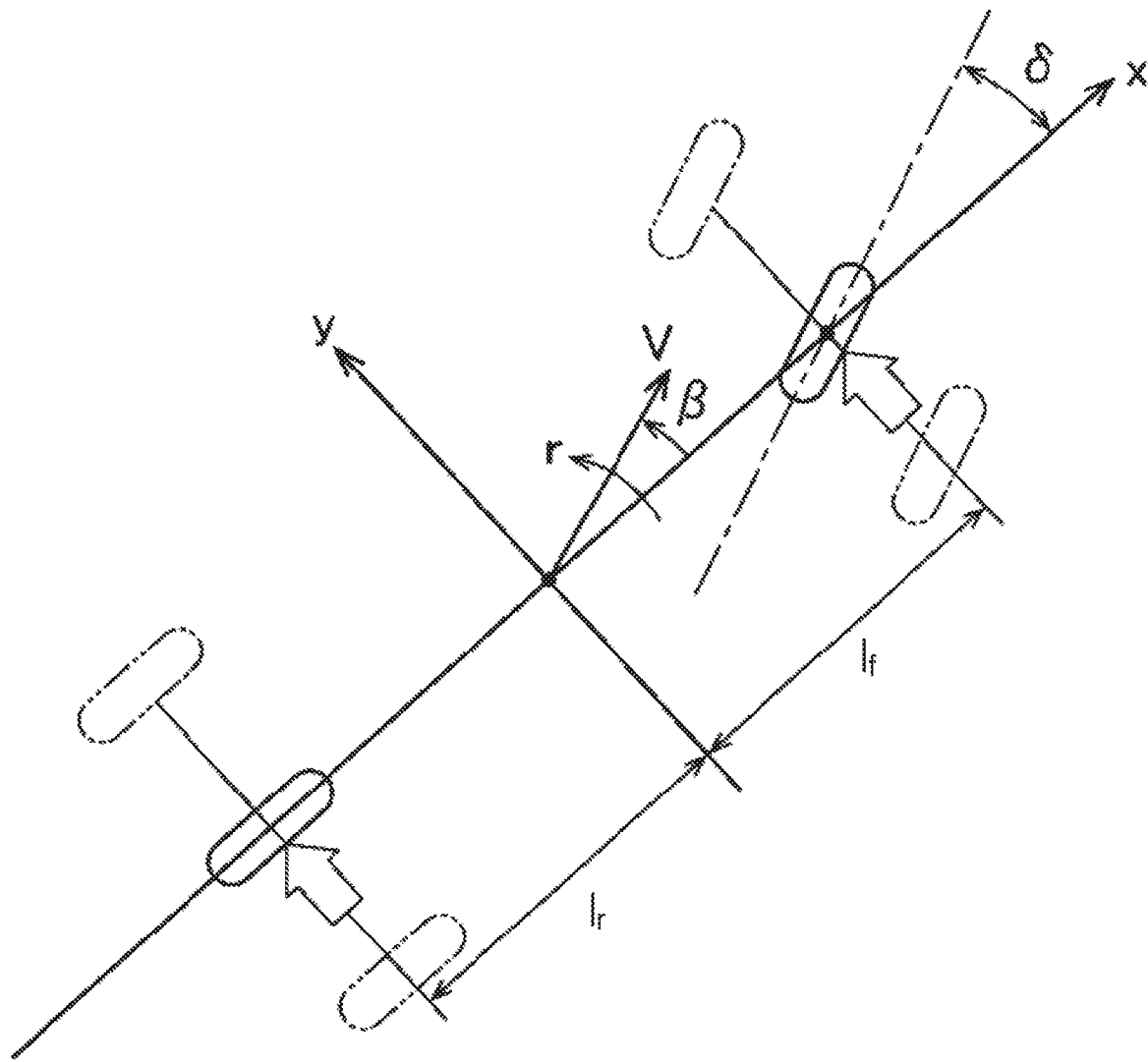
FIG. 8 is a diagram illustrating a vehicle model for the vehicle controller according to the embodiment of the present disclosure.

With reference to FIGS. 6 to 8, the following describes a travel-route correction processing performed by the second route computation module 10d included in the ECU 10 in this embodiment. FIG. 6 is a diagram illustrating evasion of an obstacle through correction of a travel route. FIG. 7 is a graph showing the relationship between the allowable upper limit of the speed of a vehicle passing an obstacle and the clearance therebetween for the obstacle evasion. FIG. 8 is a diagram illustrating a vehicle model.

With reference to FIG. 6, the vehicle 1 traveling on a road (lane) 7 is about to overtake and pass the vehicle 3 which is traveling or at a stop.

Generally, when overtaking (or passing) an obstacle (e.g., a preceding vehicle, a parked vehicle, a pedestrian) on or near a road, the driver of the vehicle 1 maintains a certain clearance or space (lateral distance) between the vehicle 1 and the obstacle in the lateral direction orthogonal to the traveling direction and decelerates the vehicle 1 to a speed at which the driver feels safe. Specifically, the driver reduces the relative speed with respect to the obstacle as the clearance decreases so as to avert risks of encountering, for example, a preceding vehicle suddenly changing its heading, a pedestrian coming out of a blind spot behind an obstacle, an opening door of a parked vehicle.

When approaching a preceding vehicle from behind, the driver of the vehicle 1 generally adjusts the speed (relative speed) in accordance with the vehicle-to-vehicle distance (longitudinal distance) in the traveling direction. Specifically, the driver maintains a fast approach speed (relative speed) for a long vehicle-to-vehicle distance, and reduces the approach speed as the vehicle-to-vehicle distance decreases. Ultimately, the vehicles travel at a relative speed of zero with a certain distance therebetween. The same holds true for the case in which the preceding vehicle is a parked vehicle.

As described above, the driver drives the vehicle 1 in a manner to avert risks, with attention to the relationship between the vehicle-to-obstacle distance (including the lateral distance and the longitudinal distance) and the relative speed.

As illustrated in FIG. 6, this embodiment thus specifies a plurality of two-dimensional distributions (speed limit distributions 40) in which allowable upper limits of the relative speed are designated to areas (a lateral region, a rear region, and a front region) around the obstacle (e.g., the parked vehicle 3) detected by the vehicle 1, or at least to the area between the obstacle and the vehicle 1. In the speed limit distributions 40, allowable upper limits $V_{lim}$ of the relative speed are designated to the points around the obstacle. In this embodiment, every drive assistance mode corrects the travel routes such that the relative speed of the vehicle 1 with respect to the obstacle does not exceed the allowable upper limits $V_{lim}$ in the speed limit distributions 40.

As indicated in FIG. 6, the speed limit distributions 40 are principally provided such that the allowable upper limit of the relative speed decreases as the lateral distance and the longitudinal distance from the obstacle decrease (as the vehicle 1 approaches the obstacle). For easy understanding, FIG. 6 uses equal relative-speed lines each linking points to which the same allowable upper limits are designated. Equal relative-speed lines a, b, c, and d correspond to allowable upper limits $V_{lim}$ of 0 km/h, 20 km/h, 40 km/h, and 60 km/h, respectively. In this example, equal relative-speed regions are substantially rectangular. As described above, in a case where an obstacle (nearby object) to be avoided is recognized by the input processing module 10a and selected by the nearby-object detection module 10b, the second-travel-route computation module 10d provides upper limit lines of the allowable relative speed at which the vehicle 1 may travel with respect to the obstacle. Then, the target travel route computed by the first route computation module 10c is corrected so as to conform to the upper limit lines.

Each of the speed limit distributions 40 does not necessarily extend around the entire perimeter of the obstacle, and is only required to be provided at least on the rear side of the obstacle and one lateral side thereof where the vehicle 1 is present (in the area on the right side of the vehicle 3 in FIG. 6).

As indicated in FIG. 7, when the vehicle 1 travels at an absolute speed, the allowable upper limit $V_{lim}$ on the lateral side of the obstacle remains at 0 (zero) km/h until a clearance X reaches $D_0$ (safe distance), and the allowable upper limit $V_{lim}$ on the lateral side of the obstacle increases quadratically after the clearance X reaches and exceeds $D_0$ ($V_{lim}=k(X-D_0)^2$ where $X \geq D_0$). Thus, to ensure safety, the relative speed of the vehicle 1 is zero when the clearance X is equal to or less than $D_0$. When the clearance X is equal to or greater than $D_0$, the vehicle 1 is allowed to overtake the obstacle at a higher relative speed as a greater clearance between the vehicle 1 and the obstacle.

In the example in FIG. 7, the allowable upper limit on the lateral side of the obstacle is given by $V_{lim}=f(X)=k(X-D_0)^2$. Note that k is a gain constant associated with the degree of change in $V_{lim}$ with respect to X, and is given in accordance with the types of obstacles. Similarly, $D_0$ is given in accordance with the types of obstacles.

In this embodiment, $V_{lim}$ is given as a quadric function of X but is not limited thereto. $V_{lim}$ may be, for example, a linear function. The allowable upper limit $V_{lim}$ on the lateral side of the obstacle has been described with reference to FIG. 7. The allowable upper limits $V_{lim}$ in all of the radial directions including the longitudinal direction of the obstacle may be given in a similar manner. The coefficient k and the safe distance $D_0$ may be given in accordance with the direction from the obstacle.

The speed limit distributions 40 may be specified based on various parameters. The parameters to be taken into account include the relative speed of the vehicle 1 with respect to the obstacle, the type of the obstacle, the traveling direction of the vehicle 1, the speed and direction of movement of the obstacle, the length of the obstacle, and the absolute speed of the vehicle 1. Thus, the coefficient k and the safe distance $D_0$ may be selected based on these parameters.

In this embodiment, the obstacle may be a vehicle, a pedestrian, a bicycle, a cliff, a ditch, a hole, a fallen object, etc. Furthermore, a vehicle is discernible as an automobile, a truck, or a motorcycle. A pedestrian is discernible as an adult, a child, or a mass.

As illustrated in FIG. 6, while the vehicle 1 travels on a road 7, the input processing module 10a included in the ECU 10 of the vehicle 1 detects an obstacle (the vehicle 3) based on the image data provided by the camera 21. In this process, the type of the obstacle (a vehicle or a pedestrian in this example) is identified.

The input processing module 10a computes the position of the obstacle (the vehicle 3) with respect to the vehicle 1, the relative speed, and the absolute speed based on the measurement data provided by the millimeter wave radar 22 and the vehicle speed data provided by the speed sensor 23. The position of the obstacle includes an x-direction position (the distance in the longitudinal direction) along the traveling direction of the vehicle 1 and a y-direction position (the distance in the lateral direction) along the lateral direction orthogonal to the traveling direction.

The second route computation module 10d included in the ECU 10 specifies the speed limit distributions 40 for every detected obstacle (the vehicle 3 in the example in FIG. 6). The second route computation module 10d corrects the travel route such that the speed of the vehicle 1 does not exceed the allowable upper limits $V_{lim}$ in the speed limit distributions 40. In step with the obstacle evasion, the second route computation module 10d computes the second target travel route by correcting the target travel route adopted in accordance with the drive assistance mode selected by the driver. Note that the second target travel route computed by the second route computation module 10d defines a travel route extending over a section shorter than the first target travel route computed by the first route computation module 10c.

Specifically, in a case where the vehicle 1 traveling on the first target travel route computed by the first route computation module 10c possibly exceeds an allowable upper limit in the speed limit distributions 40 when passing a certain target position, the first target travel route is corrected for the computation of the second target travel route conforming to the speed limit distributions 40. Examples of the second target travel route include a route (e.g., a route Rc1 in FIG. 6) generated for the original target positions and reduced target speeds, a route (e.g., a route Rc3) generated for the original target speed and alternative target positions on a detour so as to prevent the target speed from exceeding the allowable upper limits, and a route (e.g., a route Rc2) generated for alternative target positions and alternative target speeds.

FIG. 6 illustrates an example in which a first target travel route R originally computed is a route for guiding the vehicle 1 to travel through the central position (target position) in the width direction of the road 7 at 60 km/h (target speed). Although the vehicle 3 being an obstacle is parked ahead in this example, the step of computing the first target travel route R disregards the obstacle so as to reduce the computation load as described above.

When traveling on the first target travel route R, the vehicle 1 crosses the equal relative-speed lines d, c, c, and d of the speed limit distributions 40 in this order. Specifically, the vehicle 1 traveling at 60 km/h enters the region within the equal relative-speed line d (the allowable upper limit $V_{lim}$=60 km/h). Thus, the second route computation module 10d generates the second target travel route Rc1 by correcting the first target travel route R such that the target speeds at the target positions on the first target travel route R are equal to or below the allowable upper limits $V_{lim}$. Thus, on the corrected second target travel route Rc1, the target speed gradually decreases to fall below 40 km/h as the vehicle 1 approaches the vehicle 3 such that the target speeds at the target positions are equal to or below the allowable upper limits $V_{lim}$. Then, the target speed gradually increases to the original target speed, namely, 60 km/h as the vehicle 1 moves away from the vehicle 3.

The second target travel route Rc3 is provided to allow the vehicle 1 to travel at the same target speed (60 km/h) as in the case of traveling on the first target travel route R, and thus requires the vehicle 1 to travel outside the area enclosed by the equal relative-speed line d (corresponding to a relative speed of 60 km/h). To allow the vehicle 1 to travel at the same target speed as in the case of traveling the first target travel route R, the second route computation module 10d generates the second target travel route Rc3 by correcting the first target travel route R such that the target positions are located on the equal relative-speed line d or outside the area enclosed by the equal relative-speed line d. Thus, the target speed for the second target travel route Rc3 is maintained at the target speed for the first target travel route R, namely, 60 km/h.

The second target travel route Rc2 is provided for target positions and target speeds different from the target positions and the target speed for the first target travel route R. On the second target travel route Rc2, the target speed is not maintained at 60 km/h. The target speed gradually decreases as the vehicle 1 approaches the vehicle 3, and then, the target speed gradually increases to the original target speed, namely, 60 km/h as the vehicle 1 moves away from the vehicle 3.

As in the case of generating the second target travel route Rc1, correcting the first target travel route R by changing the original target speed alone and using the same target positions is applicable to the drive assistance modes which involve the speed control and no steering control (e.g., the automatic speed control mode, the speed limit mode, the basic control mode).

As in the case of generating the second target travel route Rc3, modifying the first target travel route R by changing the original target positions alone and using the same target speed is applicable to the drive assistance modes which involve the steering control (e.g., the preceding-vehicle following mode).

As in the case of generating the second target travel route Rc2, correcting the first target travel route R by changing both the target positions and the target speed is applicable to the drive assistance modes which involve speed control and steering control (e.g., the preceding-vehicle following mode).

Next, the second route computation module 10d included in the ECU 10 selects, from among the adoptable second target travel routes, the optimum second target travel route on the basis of, for example, sensor information. Specifically, the second route computation module 10d selects, from among the adoptable second travel routes, the optimum second target travel route based on given evaluation functions and given constraints.

In the ECU 10, a memory stores an evaluation function J, constraints, and vehicle models. When determining the optimal second target travel route through the correction processing, the second route computation module 10d computes the optimal second target travel route which attains the extremum of the evaluation function J within a range conforming to the constraints and the relevant vehicle model (optimization processing).

The evaluation function J includes a plurality of evaluation factors. The evaluation factors employed in this example are functions for evaluating the suitability of each travel route obtained by correcting the first target travel route, in terms of speeds (in the longitudinal and lateral directions), accelerations (in the longitudinal and lateral directions), the amount of change in acceleration (in the longitudinal and lateral directions), a yaw rate, a lateral position relative to the centerline of a lane, a vehicle angle, a steering angle, other soft constraints, etc.

The evaluation factors include evaluation factors associated with the behaviors of the vehicle 1 in the longitudinal direction (longitudinal evaluation factors: a speed and an acceleration in the longitudinal direction, the amount of change in the acceleration, etc.) and evaluation factors associated with the behaviors of the vehicle 1 in the lateral direction (lateral evaluation factors: a speed and an acceleration in the lateral direction, the amount of change in the acceleration, a yaw rate, a lateral position relative to the centerline of the lane, a vehicle angle, a steering angle, etc.).

In this embodiment, the evaluation function J is expressed by the following equation.

$$J = \sum_{0}^{N} \{W_1(X_1 - X_{ref1})^2 + W_2(X_2 - X_{ref2})^2 + \ldots + W_n(X_n - X_{refn})^2\}$$

In the above equation, $W_k(X_k - X_{refk})^2$ gives an evaluation factor, $X_k$ is a physical quantity associated with the evaluation factor for a corrected travel route, $X_{refk}$ is a physical quantity associated with the evaluation factor for the first target travel route (prior to the correction), and $W_k$(k=1 to n) is a weighting value for the evaluation factor. Thus, the evaluation function J in this embodiment is equivalent to the sum of physical quantities associated with evaluation factors for the first to n-th sections (e.g., each section extending about 0.2 km) constituting the travel route, with each physical quantity obtained by assigning weights to the square of the difference between a physical quantity on a corrected travel route and a physical quantity on the first target travel route (prior to the correction).

In this embodiment, the evaluation function J is smaller for a more highly regarded travel route obtained by correcting the first target travel route, and thus the second route computation module 10d generates as the second target travel route by computation, an optimum travel route which attains the minimum value of the evaluation function J.

The constraints are conditions to be met by the corrected travel routes. Potential travel routes to be evaluated are narrowed down based on the constraints. This lightens the computation load applied during the optimization processing executing the evaluation function J and enables reductions in computation time accordingly.

The vehicle model defines the physical motion of the vehicle 1 and is expressed by the following equation of motion. The vehicle model in this example is a bicycle model illustrated in FIG. 8. The vehicle model defines the physical motion of the vehicle 1, thus helps computing corrected travel routes which reduce driver discomfort during a drive and enabling early completion of the optimization processing executing the evaluation function J.

$$mV\left(\frac{d\beta}{dt}+r\right)=-2K_f\left(\beta+\frac{l_f}{V}r-\delta\right)-2K_r\left(\beta-\frac{l_r}{V}r\right) \quad (1)$$

$$I\frac{dr}{dt}=-2K_f\left(\beta+\frac{l_f}{V}r-\delta\right)l_f+2K_r\left(\beta-\frac{l_r}{V}r\right)l_r \quad (2)$$

In FIG. 8 and the above equations (1) and (2), m is the mass of the vehicle 1, I is the yawing moment of inertia of the vehicle 1, l is the wheelbase, $l_f$ is the distance between the center of gravity and the front axle of the vehicle 1, $l_r$ is the distance between the center of gravity and the rear axle of the vehicle 1, $K_f$ is the cornering power of each front wheel tire, $K_r$ is the cornering power of each rear wheel tire, V is the speed of the vehicle 1, δ is the actual steering angle of the front wheel, β is the side-slip angle at the center of gravity of the vehicle 1, r is the yaw angular speed of the vehicle 1, θ is the yaw angle of the vehicle 1, y is the lateral displacement of the vehicle 1 with respect to the absolute space, and t is time.

As described above, the second route computation module 10d selects by computations the optimum second target travel route which gives the minimum evaluation function J from among a number of travel routes based on the first target travel route, the constrains, the vehicle model, etc.

Figure 9:
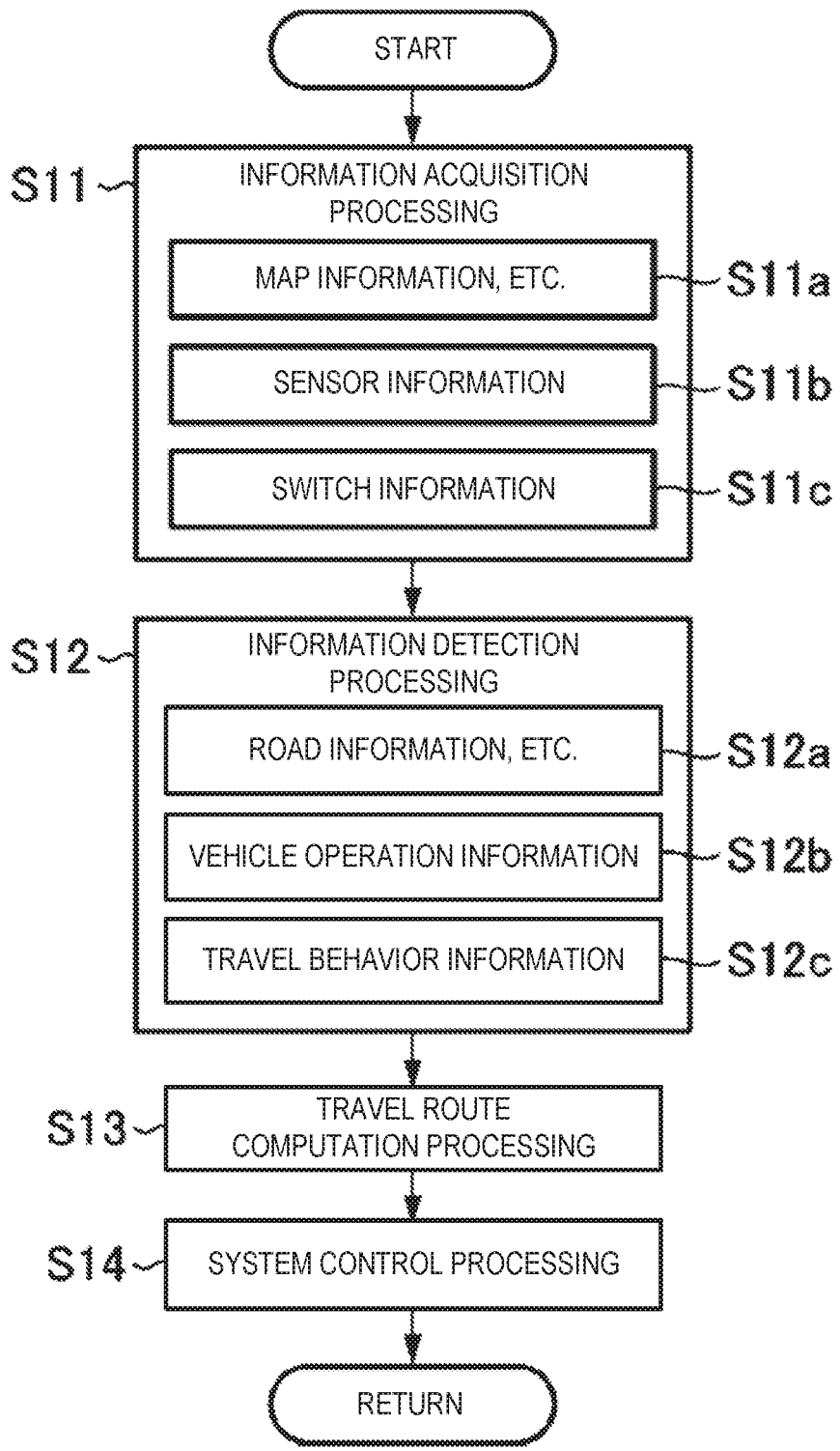
FIG. 9 is a flowchart of a drive assistance control processed by the vehicle controller according to the embodiment of the present disclosure.
Figure 10:
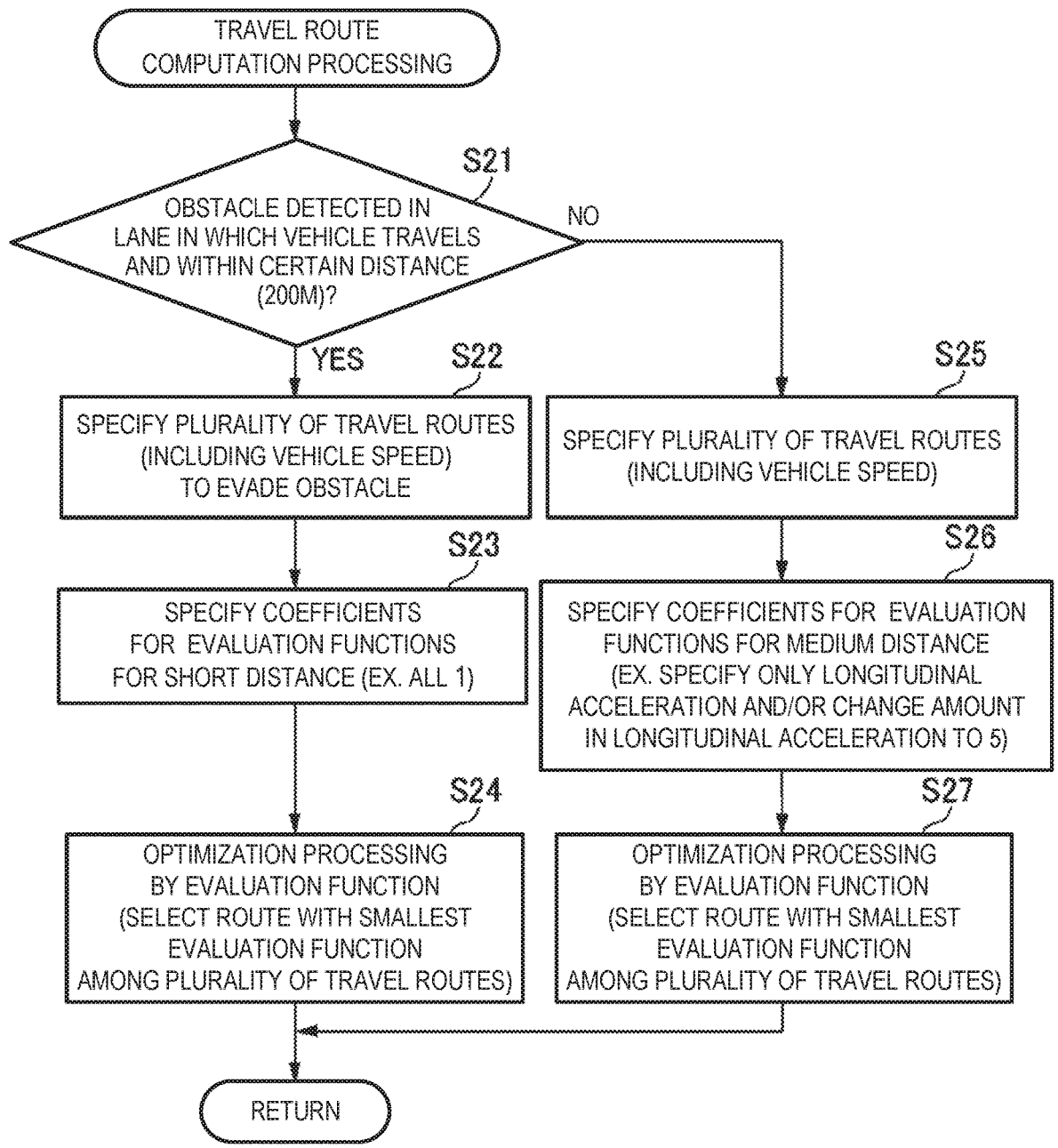
FIG. 10 is a flowchart of travel route computations performed by the vehicle controller according to the embodiment of the present disclosure.

With reference to FIGS. 9 and 10, the following describes the flow of the drive assistance control processed by the vehicle controller 100 according to this embodiment. FIG. 9 is a flowchart of the drive assistance control. FIG. 10 is a flowchart of travel route computations.

The ECU 10 repeatedly executes the processing shown in the flowchart of FIG. 9 at certain intervals (e.g., every 0.1 seconds). First, the input processing module 10a of the ECU 10 executes information acquisition processing (S11). In the information processing, the ECU 10 acquires the current vehicle position information, the map information, information on nearby objects, etc., from the positioning system 24, the navigation system 25, the vehicle-to-vehicle communication system 26, and the road-to-vehicle communication system 27 (S11a), and acquires the sensor information from, for example, the camera 21, the millimeter wave radar 22, and the speed sensor 23 (S11b). Additionally, Step S11b may include acquisition of sensor information from, for example, an acceleration sensor, a yaw rate sensor, and the driver's interface. Note that switch information may be acquired from, for example, a steering angle sensor, an accelerator sensor, and a brake sensor which are not illustrated (S11c).

Next, the ECU 10 executes information detection processing (S12) using various types of information acquired in the information processing (S11). In the information detection processing, the ECU 10 detects road information on the shape of the road around or ahead of the vehicle 1 (e.g., linear sections and curving sections (if any), the length of each section, the curvature radius in each curving section, the lane width, the positions of the lane edges, the number of lanes, intersections (if any), the speed limit prescribed in accordance with the curvature of a curve), traffic regulation information (e.g., speed limits, red lights), and the preceding-vehicle track information (the position and the speed of the preceding vehicle), from the current vehicle position information, the map information, the information provided by the vehicle-to-vehicle communication system, the information provided by the road-to-vehicle communication system, and the sensor information (S12a). In the information detection processing, the nearby-object detection module 10b of the ECU 10 also detects information on nearby objects (e.g., presence of obstacles on travel routes, the type, size, and position of each obstacle (if any)) from the information provided by the vehicle-to-vehicle communication system, the information from the road-to-vehicle communication system, and the sensor information.

The ECU 10 detects vehicle operation information on the operation of the vehicle by the driver (e.g., a steering angle, the degree of depression of the accelerator pedal, the degree of depression of the brake pedal) from the switch information (S12b), and detects travel behavior information on the behaviors of the vehicle 1 (e.g., the vehicle speed, longitudinal acceleration, lateral acceleration, a yaw rate) from the switch information and the sensor information (S12c).

Then, the ECU 10 executes travel route computation processing based on the information acquired by detections (S13). Subsequently, the ECU 10 outputs request signals to relevant control systems (the engine control system 31, the brake control system 32, and the steering control system 33) such that the vehicle travels on a target travel routes computed in the travel route computation processing (S14). In other words, the ECU 10 controls the traveling speed and/or the steering of the vehicle such that the vehicle travels on the first target travel route computed by the first route computation module 10c or on the second target travel route computed by the second route computation module 10d. Specifically, the ECU 10 generates and outputs request signals in accordance with target controlled variables for the engine, the brake, and the steering specified with the computed first or second target travel route.

With reference to FIG. 10, the following describes the travel route computation processing executed in Step S13 of the flowchart shown in FIG. 9. FIG. 10 is a flowchart of the travel route computation processing, which is to be executed as a subroutine of the flow shown in FIG. 9.

First, in Step S21 in FIG. 10, it is determined whether the nearby-object detection module 10b has detected a nearby object to be avoided (obstacle) in the lane in which the vehicle 1 travels and within a certain distance from the vehicle 1. If no nearby object to be avoided is detected, the processing of Step S25 and the subsequent steps are executed, and the first target travel route computed by the first route computation module 10c is adopted as a travel route on which the vehicle 1 is to travel. If a nearby object to be avoided is detected, the ECU 10 executes Step S22 and the subsequent steps to switch the target travel route to the second target travel route computed by the second route computation module 10d.

In this embodiment, the above distance is set to be about 0.2 km, which is an allowable range for detection of nearby objects by the millimeter wave radar 22. The second target travel route is computed for the short-distance section. In a case where the nearby-object detection module 10b has detected an obstacle beyond a distance of about 0.2 km in the lane in which the vehicle 1 travels, the processing of Step S25 and the subsequent steps are executed, and the first target travel route is adopted as the travel route for the vehicle 1. Thus, the computation of the target travel route disregards any obstacle or the like detected beyond the short-distance section for which the second target travel route is computed for evasion of obstacles. In this embodiment, switching to the second target travel route is made when an obstacle is detected within the short-distance section (e.g., about 0.2 km). In some embodiments of the present disclosure, provided that an obstacle has been detected, switching to the second target travel route may be made when the driver reaches a point at a certain distance (e.g., about 0.15 km) from the detected obstacle where the driver can visually identify it.

The processing in Steps S25 to S27 is executed by the first route computation module 10c of the ECU 10.

First, in Step S25, a plurality of travel routes are specified as potential first target travel routes, which span a relatively long distance, namely, a medium-distance section (e.g., about 0.5 to 1 km). These travel routes specified in this processing are the travel routes described with reference to FIGS. 3 to 5. In addition, different types of travel routes may be specified along the same line depending on different travel speeds at different points along the line. The information on the road conditions (e.g., a straight line, a curve, an uphill road, a downhill road) in the medium-distance section may be detected from the map data stored in the navigation system 25, the vehicle-to-vehicle communication system 26, or the road-to-vehicle communication system 27. The road conditions in the medium-distance section to be taken into account may include traffic lights and stop signs. The potential first target travel routes are designed to conform to the given constraints.

The first route computation module 10c computes the evaluation functions J for the potential travel routes specified in Step S25 and selects, as the first target travel route, the travel route which gives the smallest evaluation function J. In Step S26, coefficients for the evaluation functions J (weighting values $W_k$ for the evaluation factors) are determined. The weighting values $W_k$ by which the respective evaluation factors are multiplied are determined in Step S26 such that the weighting values assigned to the evaluation factors associated with the longitudinal acceleration and the jerk (changes in the longitudinal acceleration over time) of the vehicle are greater than the other weighting values. For example, the weighting values $W_k$ assigned to the evaluation factors associated with the longitudinal acceleration and the jerk of the vehicle may be about five times the weighting values $W_k$ assigned to the other evaluation factors (e.g., the weighting values for the longitudinal acceleration and the jerk=5, the weighting values $W_k$ for the other evaluation factors=1).

Next, in Step S27, values of the evaluation functions J using the weighting values determined in Step S26 are calculated for the individual travel routes specified in Step S25, and then the travel route which gives the smallest evaluation function J is selected as the first target travel route. In Step S26, the weighting values $W_k$ by which the respective evaluation factors are multiplied are determined such that the weighting values $W_k$ assigned to the evaluation factors associated with the longitudinal acceleration and the jerk of the vehicle are greater than the other weighting values $W_k$. Among the potential travel routes, the travel routes which give greater longitudinal accelerations and/or greater jerks tend to be rated low in terms of the evaluation functions J (tend to yield greater evaluation functions J). Thus, of the potential travel routes, a travel route which gives a smaller longitudinal acceleration and/or a smaller jerk and requires lower energy consumption (allows a vehicle driven by an internal-combustion engine to achieve good fuel mileage) is selected as the first target travel route determined by using the evaluation functions J in Step S27. In this way, the first route computation module 10c computes the first target travel route so as to prompt the vehicle 1 to travel with lower energy consumption.

Although this embodiment uses the evaluation functions J to adopt a travel route which requires lower energy consumption as the first target travel route, information obtained through the navigation system 25, the vehicle-to-vehicle communication system 26, or the road-to-vehicle communication system 27 may be used to select, as the first target travel route, a motorway or a road with fewer traffic lights.

If a nearby object to be avoided is detected in Step S21, the processing of Step S22 and the subsequent steps are executed. In Steps S22 to S24, the second route computation module 10d computes the second target travel route. First, in Step S22, travel routes which span a relatively short distance, namely, a short-distance section (e.g., about 0.2 km) is specified. These travel routes specified in this processing are the travel routes described with reference to FIGS. 3 to 5. Note that these travel routes are specified for a section shorter than the medium-distance section (e.g., about 0.5 to 1 km) relevant to Step S25. The specified travel routes are corrected for evasion of detected nearby objects. As described above with reference to FIG. 6, the travel routes are corrected through computations so as to conform to the speed limit distributions 40 designated to the area around the nearby object to be avoided. In addition, more than one travel routes conforming to the speed limit distributions 40 may be specified as described above, and these travel routes are potential second target travel routes. The potential second target travel routes are designed to conform to the given constraints.

The second route computation module 10d computes the evaluation functions J for the potential travel routes specified in Step S22, and selects the travel route which gives the smallest evaluation function J as the second target travel route. In Step S23, coefficients for the evaluation functions J (the weighting values $W_k$ for the evaluation factors) are determined. In Step S23, all of the weighting values $W_k$ by which the respective evaluation factors are multiplied are the same (e.g., $W_k=1$).

Then, in Step S24, values of the evaluation functions J using the weighting values determined in Step S23 are calculated for the individual travel routes specified in Step S22, and then the travel route which gives the smallest evaluation function J is selected as the second target travel route. All of the weighting values $W_k$ by which the respective evaluation factors are multiplied are the same in Step S23, so that the values of the evaluation functions J are calculated with equal evaluation of the evaluation factors. Thus, the first target travel route is specified to allow the vehicle 1 to travel with lower energy consumption, whereas the second target travel route is specified to allow the vehicle 1 to avoid the nearby object detected by the nearby-object detection module 10b. In addition, of the potential routes, a route which allows the vehicle 1 to most smoothly avoid an obstacle or the like is selected as the second target travel route.

If no nearby object to be avoided is detected, the first target travel route is computed as the travel route for the vehicle 1 through the processing of Step S25 and the subsequent steps. If a nearby object to be avoided is detected, the second target travel route is computed as the travel route through the processing of Step S22 and the subsequent steps. Then, one cycle of the processing shown by the flowchart in FIG. 10 is ended. In this embodiment, Step 21 is performed to select the processing of Step S22 and the subsequent steps or the processing of Step S25 and the subsequent steps, so that one of the first target travel route and the second target travel route is computed. Note that both the first target travel route and the second target travel route may be computed, and either one of these routes may be selected (switching between these routes may be made) depending on whether a nearby object to be avoided is detected.

As described above, once the processing shown by the flowchart in FIG. 10 is completed, the processing shown by the flowchart in FIG. 9 resumes. In Step S14 of FIG. 9, the control module 10e of the ECU 10 controls the traveling speed and/or the steering of the vehicle so as to prompt the vehicle to travel on the first target travel route or the second target travel route computed in accordance with the flowchart in FIG. 10.

According to the vehicle controller 100, the control module 10e controls the traveling speed and/or the steering of the vehicle to travel on the first target travel route computed to allow the vehicle 1 to travel with lower energy consumption. This enables the vehicle to reduce its energy consumption. In addition, the control module 10e switches the target travel route to the second target travel route when a nearby object to be avoided is detected within a range at a certain distance from the vehicle 1. Thus, only when the vehicle needs to avoid the nearby object, the second target travel route is adopted, and the driver is less likely to experience discomfort accordingly.

According to the vehicle controller 100, the second target travel route defines a travel route extending over a section (e.g., about 0.2 km) shorter than the first target travel route. This prevents early start of the vehicle control for evasion of an obstacle or the like in a faraway position, and the driver is less likely to feel discomfort (rarely experience discomfort) accordingly.

According to the vehicle controller 100, a plurality of speed limit distributions (see FIG. 6) in which allowable upper limits of the relative speed are designated to areas around the nearby object to be avoided, and the second target travel route conforming to the speed limit distributions are computed. This enables the vehicle to avoid an obstacle or the like in an appropriate manner according to the circumstances, and the driver is less likely to feel discomfort accordingly.

The preferred embodiment of the present disclosure has been described above. Note that various modifications may be made to the above described embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
10 ECU
10a Input Processing Module
10b Nearby-Object Detection Module
10c First Route Computation Module (First-Target-Route Computation Module)
10d Second Route Computation Module (Second-Target-Route Computation Module)
10e Control Module
21 Camera
22 Millimeter Wave Radar
23 Speed Sensor
24 Positioning System
25 Navigation System
26 Vehicle-to-Vehicle Communication System
27 Road-to-Vehicle Communication System
31 Engine Control System
32 Brake Control System
33 Steering Control System
40 Speed Limit Distribution
100 Vehicle Controller

What is claimed is:

1. A vehicle controller configured to control traveling of a vehicle, comprising:
a processor configured to execute:
a nearby-object detection module to detect a nearby object;
a first route computation module to compute a first target travel route specifying a route on which the vehicle is to travel and a speed at which the vehicle is to travel along the route;
a second route computation module to compute a second target travel route specifying a route on which the vehicle is to travel and a speed at which the vehicle is to travel along the route, so as to prompt the vehicle to avoid the detected nearby object; and
a control module to control at least one of a traveling speed and steering of the vehicle so as to prompt the vehicle to travel on one of the first target travel route and the second target travel route, wherein
the first route computation module computes the first target travel route so as to prompt the vehicle to travel with lower energy consumption,
the control module switches the target travel route to the second target travel route when the nearby object to be avoided is detected within a range at a certain distance from the vehicle, and
the second route computation module specifies a plurality of discrete speed limit distributions in which allowable discrete upper limits of a relative speed are designated to areas around the nearby object to be avoided detected by the nearby-object detection module, and computes the second target travel route conforming to the plurality of discrete speed limit distributions.

2. The vehicle controller according to claim 1, wherein the second target travel route defines a travel route extending over a section shorter than the first target travel route.

3. The vehicle controller according to claim 2, wherein
when the second route computation module determines that the vehicle traveling on the first target travel route computed by the first route computation module exceeds an allowable discrete upper limit in the first speed limit distribution, the second route computation module corrects the first target travel route for the computation of the second target travel route conforming to the first speed limit distribution, and
when the second route computation module determines that the vehicle traveling on the first target travel route computed by the first route computation module exceeds an allowable discrete upper limit in the second speed limit distribution, the second route computation module corrects the first target travel route for the computation of the second target travel route conforming to the second speed limit distribution.

4. The vehicle controller according to claim 1, wherein
when the second route computation module determines that the vehicle traveling on the first target travel route computed by the first route computation module exceeds an allowable discrete upper limit in the first speed limit distribution, the second route computation module corrects the first target travel route for the computation of the second target travel route conforming to the first speed limit distribution, and when the second route computation module determines that the vehicle traveling on the first target travel route computed by the first route computation module exceeds an allowable discrete upper limit in the second speed limit distribution, the second route computation module corrects the first target travel route for the computation of the second target travel route conforming to the second speed limit distribution.

5. The vehicle controller according to claim 4, wherein the plurality of discrete speed limit distributions are configured so that the allowable discrete upper limits of the relative speed decrease as a lateral distance and a longitudinal distance from the nearby object decrease.

6. The vehicle controller according to claim 4, wherein the first target travel route is configured so that a midsection of the vehicle in a width direction of the vehicle passes through a midsection in a width direction of lane edges detected by a camera, not using detection information from the nearby-object detection module indicating whether the nearby object is detected within the range at the certain distance from the vehicle.

\* \* \* \* \*